INVENTOR
HEINRICH EBNER
BY

DEZSOE STEINHERZ.

3,445,245
PROCESS FOR ACETIC ACID FERMENTATION
Heinrich Ebner, Bonn-Ippendorf, Germany, assignor to
Heinrich Frings, Bonn, Germany
Filed Nov. 21, 1966, Ser. No. 595,835
Claims priority, application Austria, Dec. 28, 1965,
A 11,686/65; Apr. 5, 1966, A 3,217/66
Int. Cl. C12j 1/04
U.S. Cl. 99—147     4 Claims

ABSTRACT OF THE DISCLOSURE

The production of vinegar of high acetic acid concentration by submerged fermentation of mash of high alcohol content, with continuous uninterrupted supply of oxygen wherein the inoculum or unfiltered vinegar is introduced into the mash so that the acetic acid concentration is 6–9% and the alcohol concentration is 4–7% at the start of fermentation.

---

Figure 1:
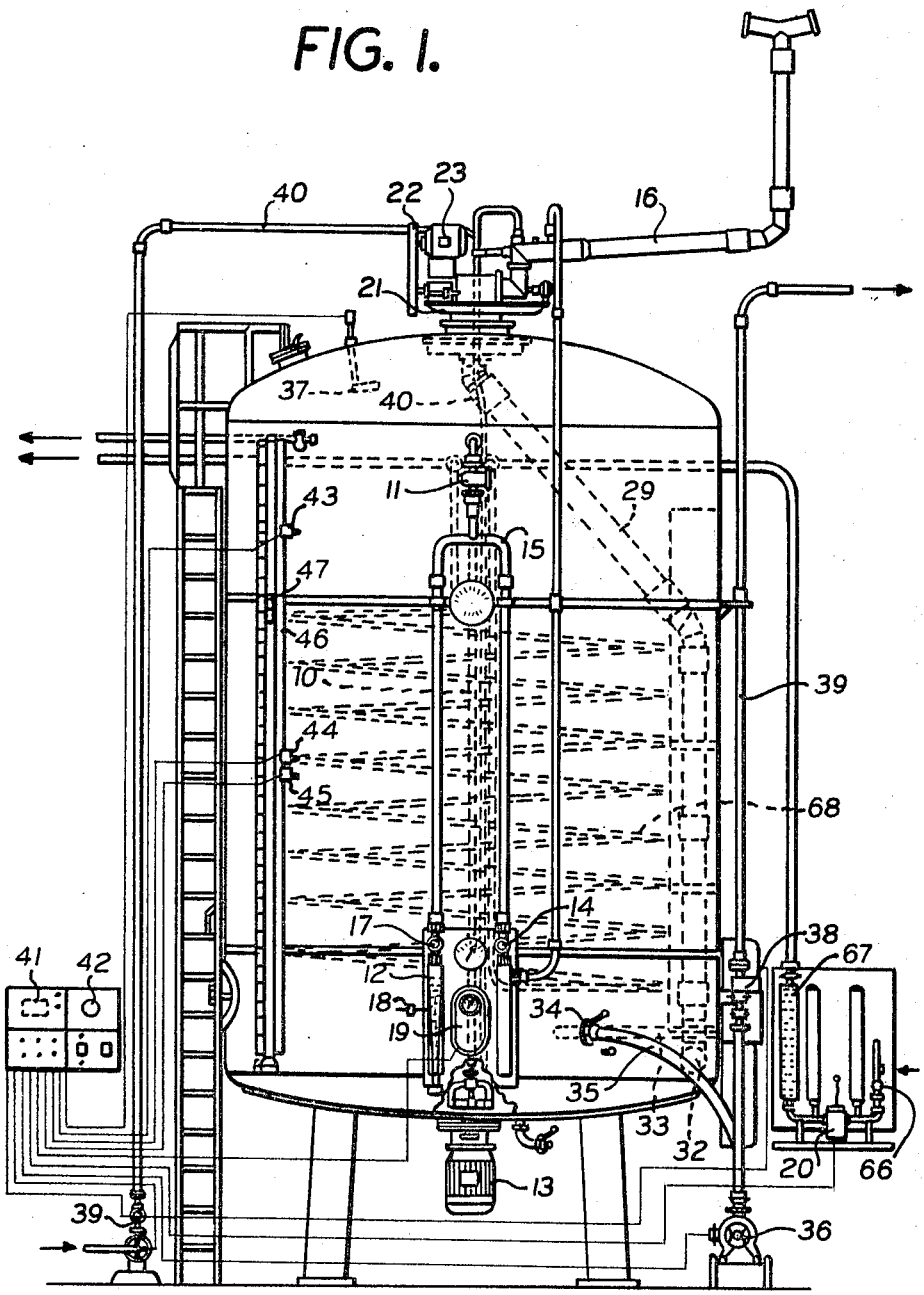

This invention relates to a process and an apparatus for the production of vinegar by submerged fermentation, especially of white vinegar having an acetic acid concentration of more than 12%.

Throughout this application, acetic acid concentration is stated in percent weight by volume, whereas the amount of alcohol is stated in percent by volume.

Basic experiments carried out in 1949 have shown the Acetobacter suspended in an aerated medium composed of alcohol, acetic acid and water become more sensitive to even the shortest interruption of the oxygen supply if the alcohol and acetic acid concentrations increase (Enzymologia 13, 369 (1949)). This fundamental knowledge made the industrial realization of submerged vinegar fermentation possible. It was found that at a total concentration (gram of acetic acid per 100 ml. + vol. percent alcohol) of 5%, an interruption of the aeration for 120 seconds proves fatal to 34% of the Acetobacter in an alcohol vinegar fermentation and that at a total concentration of 12% an equally large damage is caused by an interruption of the aeration of only 10–20 seconds, depending on the acidity (Enzymologia 25, 37 (1962)). In view of these facts, the adaptation to submerged fermentation of the vinegar fermentation of cider, malt mash, and wine carried out at a total concentration of 5–9% only and therefore easier to realize on a technical scale, was tried first and led to success (Chemikerzeitung 76, 776, 815 (1952)). The U.S. patent No. 2,707,683 does not indicate yet a way to aerate on a commercial scale the fermenting liquid uniformly and without interruption, but a number of patents describe aeration devices for the submerged vinegar fermentation. The British Patent No. 963,481 suggests the formation of an air-liquid emulsion by means of pumps, and the British Patent No. 878,949 suggests the use of air injectors. The Austrian Patent No. 173,231 suggests the use of known rotating aerators. The Swiss Patent No. 327,262 uses turbo-aerators and the U.S. Patent No. 2,997,424 describes aeration by a rotor provided with arms having openings at their ends.

All these suggestions have in common that their application is limited to submerged fermentation of mashes which are rich in extracts and have a maximum total concentration of 9 to 10%, because uniformity and intensity of the aeration do not meet the requirements of Acetobacter in a medium with a higher total concentration.

The production of white vinegar on a commercial scale by submerged fermentation with an acetic acid concentration of 10% and economically acceptable quantities of nutrients was made possible for the first time by the aeration device according to German Patent No. 961,795. Furthermore, Acetobacter species had to be adapted to the new medium.

White vinegar is used in large quantities by the canning industry. This industry demands vinegar of the highest possible acidity. Furthermore, all vinegar producers demand white vinegar of high acidity which cuts storage and transport costs. Some producers even started to increase the acidity of white vinegar by freezing-out, as there was no process available for the economical production of white vinegar of the requested strength. The freezing-out process causes considerable costs. Therefore, the problem arose to develop a highly economical and direct process for the production of white vinegar, especially with an acetic acid concentration of more than 12%. By the process and apparatus according to this invention the economical production of white vinegar with an acetic acid concentration of more than 12% was achieved for the first time.

The process is carried out in fermentation cycles which follow each other immediately. When the fermentation approaches the end, a part of the finished vinegar only is discharged from the fermentation tank before all alcohol is oxidized and replaced by fresh mash. Therefore, each cycle consists of three stages: the discharge, the charge and the current cycle. During charge the high acetic acid concentration of the finished vinegar is lowered to a certain extent and during the current cycle it is increasing again by the action of Acetobacter. Each cycle is followed by the next one without any interruption or lag phase.

To tolerate the high value of total concentration and of acetic acid, first of all a strain of Acetobacter had to be adapted over years. It has been found in tests carried out during several years that all experiments failed in which it was tried to multiply, keep, or define the strain on liquid or solid media close to neutrality according to classical methods of bacteriology. Such experiments have shown that the strain loses its assiduously adapted properties within a very short period of time. Up to now, the strain of Acetobacter retains its properties only when kept in the same medium, that is, it retains its properties only in the course of a current submerged fermentation, or, if white vinegar having a concentration of 11.5%–13% acetic acid and 0.05–1.5% alcohol, is discharged from a submerged vinegar fermentation, i.e. before the regular end of the fermentation, and is stored, untreated and unfiltered, with access of air to the resting liquid between 0 and 35° C., preferably at 20° C. This procedure is denoted hereinafter inoculation fermentation. According to the state of the art, shipment of such strain of bacteria is only possible either in the form of the so-called inoculation vinegar described above or by transport in a small and mobile pilot fermenter.

By detailed experiments, the influence of total concentration as well as of the acetic acid and alcohol concentration on the multiplication rate of Acetobacter under the conditions of submerged white vinegar fermentation, was carefully studied. It has been found that with increasing total concentration the multiplication rate of Acetobacter decreases, if all other variables are kept constant. At constant total concentration the multiplication rate of the bacteria shows a maximum at 7–8% acetic acid, but decreases upon further increasing the acetic acid concentration. Since, at the end of every fermentation cycle, a considerable part of the Acetobacter is removed from the fermentation tank together with finished vinegar it is indispensible to make conditions at the beginning of every fermentation cycle as favorable as possible for rapid multiplication of the bacteria. Therefore, an acetic acid concentration of 6–9%, preferably 7–8%, is necessary at the start of fermentation, as well as at the beginning of every fermentation cycle.

At high total concentrations Acetobacter are highly sensitive to any disturbance. It is indispensible, therefore, to maintain constant the total concentration of the mash during successive cycles within a range of ±0.3%, preferably ±0.1%.

The aeration of the fermentation liquid needs special attention. An aeration device is used supplying, without interruption, the total volume of liquid within the fermentation tank, with finest air bubbles. In view of the volatility of acetic acid and alcohol, as well as in view of an economical dosing of the total air quantity, the uniform distribution of air in finest air bubbles over the total cross section of the tank is compulsory. At the peak of the fermentation rate, the total quantiy of air should amount to between 2.5 and 6 m.$^3$ per hour per 1000 liters of fermenting liquid, preferably 3–4 m.$^3$ per hour per 1000 liters of fermenting liquid. It is absolutely necessary to observe these figures for obtaining good yields. If the air bubbles are too big, or if they are not distributed uniformly, these figures cannot be attained. Therefore, the attained oxygen consumption, acidification rate and yield are data which permit to evaluate the aeration device with regard to the air bubble size and their distribution. This is important, as it is practically impossible to measure the air bubbles, which change their diameter between the place where they are formed and until they leave the liquid surface. With the before mentioned quantities of air per hour and 1000 liters of fermenting liquid, conversion of 50 to 60 liters of alcohol (calculated as 100%) to acetic acid per 1000 liters fermenting volume and 48 hours is attained and more than 70% of oxygen introduced into the fermentation liquid, as part of the air are consumed by the Acetobacter.

In a fermenting liquid unsatisfactorily aerated, all the time bacteria die due to lack of oxygen, whereby the rate of fermentation decreases and foam is formed. Due to the relatively slow rate of multiplication of the bacteria at high total concentrations, this can be tolerated only to a very small extent. Even if the dead bacteria can be replaced by new ones due to multiplication, larger quantities of nutrients are needed. Fermentations with unsatisfactory aeration not only fail to attain good fermentation rates even if increased amounts of nutrients and air are supplied, but also foam heavily and show poor yields, and become thus uneconomical.

The mixed nutrients which the Acetobacter need may consist of carbohydrates, peptides, aminoacids, inorganic salts and trace elements (Enzymologia, 25, 37 (1962)). 2.0–3.0 kgs. of such mixture are recommended per 1000 liters of mash. The latest formula is given by the "Vinegar News Letters" of the U.S. Industrial Chemical Co., No. 43, 4 (1964), as follows: A mixture is formed by 18 lbs. corn sugar, 4.0 lbs $(NH_4)_2HPO_4$, 1.0 lb. $MgSO_4$, 1.0 lb. potassium citrate and 5.0 grams calcium pantothenate. 3.0 kgs. of this mixture per 1000 liters of mash are recommended l.c. for obtaining good fermentations. In a number of experiments I have found that in this mixture the amount of corn sugar can be reduced considerably, to 8 lbs. to be mixed with the beforementioned amounts of the other components. From his slightly changed new mix even 1.0–1.5 kgs. per 1000 liters of mash are enough to get the required fermentation rates, if all other conditions disclosed herein are observed.

All commercial aeration devices including the aeration device according to the invention, show dependence of the distribution of air bubbles in the fermenting liquid, on the volume of air introduced into the volume of fermenting liquid per unit of volume and time. Furthermore, the suction produced by the aeration device according to the invention is dependent on the height of liquid in the tank, the so-called submergence. To avoid harmful influence on the bacteria, it is, therefore, necessary to maintain constant the quantity of air sucked into and distributed uniformly in the fermenting liquid per hour at changing submergence during charge and discharge.

When the fermentation is newly started, it takes 3–14 days of aeration at fermentation temperature until the Acetobacter have multiplied to the extent that the acidity starts to increase noticeably. During this period of time nearly no oxygen is consumed. It is, therefore, possible and necessary in order to avoid evaporation losses, to reduce the air quantity which passes through the liquid during this starting stage of fermentation. But on the other hand, the amount of gas introduced into the liquid should be constant in order to avoid, as mentioned, an unsatisfactory distribuiton of the air bubbles. The problem is solved by actually keeping constant the amount of gas introduced and distributed in the liquid, but changing the composition of the gas. During this period of time, the gas volume consists preferably of only 5–20% fresh air, while 80–95% are return air, i.e. air sucked back from the exhaust pipe after having passed through the liquid once or several times.

As already mentioned above, the formation of foam is due to dying bacteria. It has been verified and it is fundamentally possible to conduct submerged white vinegar fermentations of high percentage without the least formation of foam, if the conditions described hereinafter are strictly met.

Due to technical imperfections with regard to aeration, maintenance of constant temperature, or management of fermentation, foam is formed quite often. As long as foam is formed in small quantities only during a fermentation cycle, it will not disturb the high percentage white vinegar fermentation in question. However, an accumulation of foam in the fermentation tank has to be avoided. During every discharge of finished vinegar, the foam must, therefore, be removed from the foam space on top of the fermenting liquid.

As an interruption of the metabolism of the Acetobacter cell due to lack of alcohol causes the immediate death thereof, it is necessary to remove the vinegar from the fermentation tank at the right moment, that is before the alcohol concentration sinks to 0.00%, and to charge new alcohol-containing mash into the fermentation tank immediately then.

In view of the sensitivity of the Acetobacter to all irregularities, it is further compulsory to maintain constant the fermentation temperature. The higher the fermentation temperature, the more difficult it becomes to attain high concentrations of the fermenting liquid. Therefore, the process according to the invention is carried out between 27 and 34° C., preferably at 28–30° C. At lower temperatures the multiplication rate of the Acetobacter becomes too slow.

Example

In carrying out the process of the invention, unfiltered and untreated white vinegar—inoculation vinegar produced by submerged fermentation—having an alcohol content of 0.05 to 1.5, e.g. 1.0%, by volume and an acetic acid concentration of 11.5 to 13, e.g. 12.0%, weight by volume, produced by submerged fermentation and stored under access of air to the liquid between 0 and 35° C., e.g. at 15° C., is filled into a fermentation tank. Aeration is then started by supplying without interruption the total volume of liquid with finest air bubbles. After attaining a fermentation temperature of 27–34° C., e.g. 29° C.— which is maintained by automatic cooling—a quantity of mash containing 0–2%, e.g. 1.0%, acetic acid and 11–14% alcohol, e.g. 12.5%, is added under rapid mixing until the contents of the fermentation tank attain a concentration of 6–9% acetic acid, preferably 7–8%, e.g. 7.5%, and more than 4%, preferably 5–6%, e.g. 5.5%, of alcohol. Subsequently, per 1000 liters of the contents of the fermentation tank 1.0 to 3.0 kgs., e.g. 1.5 kgs., of nutrients for the bacteria are added and prior to the start of an increase of the acidity 80–95% return air and 5–20% fresh air are used. After beginning of acetification, only fresh air is used in a quantity of 2.5–6 m.³, preferably 3–4 m.³, e.g. 3.7 m.³, per hour per 1000 liters of fermenting liquid. When reaching a concentration of 0.05 to 0.5%, e.g. 0.2%, of alcohol, such a quantity of vinegar is discharged from the fermentation tank, that refilling at constant temperature and rapid mixing with mash having a concentration of 0–2%, e.g. 1.0%, acetic acid and more than 11%, preferably 12–15%, e.g. 12.5%, alcohol, and containing per 1000 liters 1–3 kgs., e.g. 1.5 kgs., nutrients for the bacteria, leads to a starting concentration of the contents of the tank for this fermentation cycle of 6–9%, preferably 7–8, e.g. 7.5%, acetic acid and more than 4%, preferably 5–7%, e.g. 5.5%, alcohol; the step of discharging vinegar from the tank and refilling it with mash, is repeated before 0.00% alcohol is attained. The supplied quantity of air is kept continuously constant during all normal fermentation cycles independently of the filling height in the tank. The total concentration of the mash is maintained constant during successive fermentation cycles with variations in the range of ± 0.3%, preferably ±0.1%.

As already mentioned, each fermentation cycle includes discharge, charge and current cycle. In the current cycle the 5–7% alcohol are fermented until a rest of 0.05–0.5%. This first mentioned alcohol content is reached if about 40% of the fermenting volume are discharged and replaced by fresh mash. A normal fermentation cycle, as mentioned before, means an undisturbed complete cycle with a cycle time of about 40–50 hours which is practically constant if the charged mash quantities, the composition of the mash and all other conditions described herein are held constant. In case of disturbances, e.g. short interruptions of the supply with electric current, the Acetobacter are damaged to a certain extent. An abnormal fermentation cycle, which may even be as long as a new start is the result. In such a case measures, as taken to start a new fermentation, may be necessary.

If sufficient quantities of inoculation vinegar as described above are not available, it is possible to start fermentation by inoculation. The process according to the invention for the production of vinegar by submerged fermentation, especially for the production of white vinegar having an acetic acid concentration of more than 12%, then comprises: filling vinegar into a fermentation tank filtered sterile and produced by any desired process, having an acetic acid concentration of 11–12% and an alcohol content of 0.5–0.0%; adding mash having a concentration of 0–2% acetic acid and more than 12% alcohol, preferably 1% acetic acid and 15% alcohol, until the contents of the fermentation tank attain a concentration of 6–9% acetic acid and more than 4% alcohol, preferably 7–8% acetic acid and 5 to 6% alcohol; adding per 1000 liter of the contents of the fermentation tank 1.0 to 3.0 kgs. of nutrients for the bacteria, preferably 1.0–1.5 kgs., starting the aeration device capable of supplying without interruption the total volume of liquid with finest air bubbles; adding per 10,000 liters of fermenting volume after reaching the fermentation temperature of 27 to 34° C., preferably 28 to 30° C. and while said temperature range is maintained constant by an automatic cooling device, 1–5 liters of inoculum from a submerged vinegar fermentation operated as defined hereinafter, without interrupting the air supply to the inoculum for more than 10 seconds; adjusting 80–95% return air and 5–20% fresh air while waiting for a start of an increase of the acidity; adjusting 100% fresh air after the beginning of acetification in a quantity of 2.5–6, preferably 3–4 m.³, per hour per 1000 liters of fermenting liquid; discharging upon reaching a concentration of 0.05 to 0.5% of alcohol such a quantity of vinegar from the fermentation tank that refilling under constant temperature and rapid mixing with mash having a concentration of 0–2% acetic acid and more than 11% of alcohol, preferably 1% acetic acid and 12–15% alcohol and containing per 1000 liters 1–3 kgs. of nutrients for the bacteria, preferably 1.0–1.5 kgs., leads to a starting concentration of the contents of the tank for this fermentation cycle of 6–9% acetic acid and more than 4% alcohol, preferably 7–8% acetic acid and 5–7% alcohol; repeating the procedure of discharging vinegar from the tank and refilling it with mash before a concentration of 0.00% alcohol is reached as often as desired; keeping continuously constant the supplied quantity of air during all normal fermentation cycles independently of the filling height; and maintaining constant the total concentration of the mash during successive cycles within ±0.3%, preferably ±0.1%.

It is of advantage to remove the foam from the foam space on top of the fermenting liquid from time to time, preferably at every discharge of vinegar.

In carrying out the process according to the invention an apparatus is used which comprises an aeration device meeting the severest requirements of aeration, an equipment for maintaining the fermentation temperature constant at the desired level, and means for keeping constant the quantity of air sucked into the fermentation tank at any filling height.

It is also of advantage to provide a device for removing the foam from the foam space. As stated already above, Acetobacter are affected by every disturbance and irregularity at high total concentrations. Automation of every single step of the process is an improvement of the apparatus, minimizes the errors due to human imperfection and increases the obtainable concentration of acetic acid, the fermentation rate and the yield. Last not least, the ever increasing costs of qualified personnel justify the use of apparatus for automation of the entire fermentation process.

Figure 2:
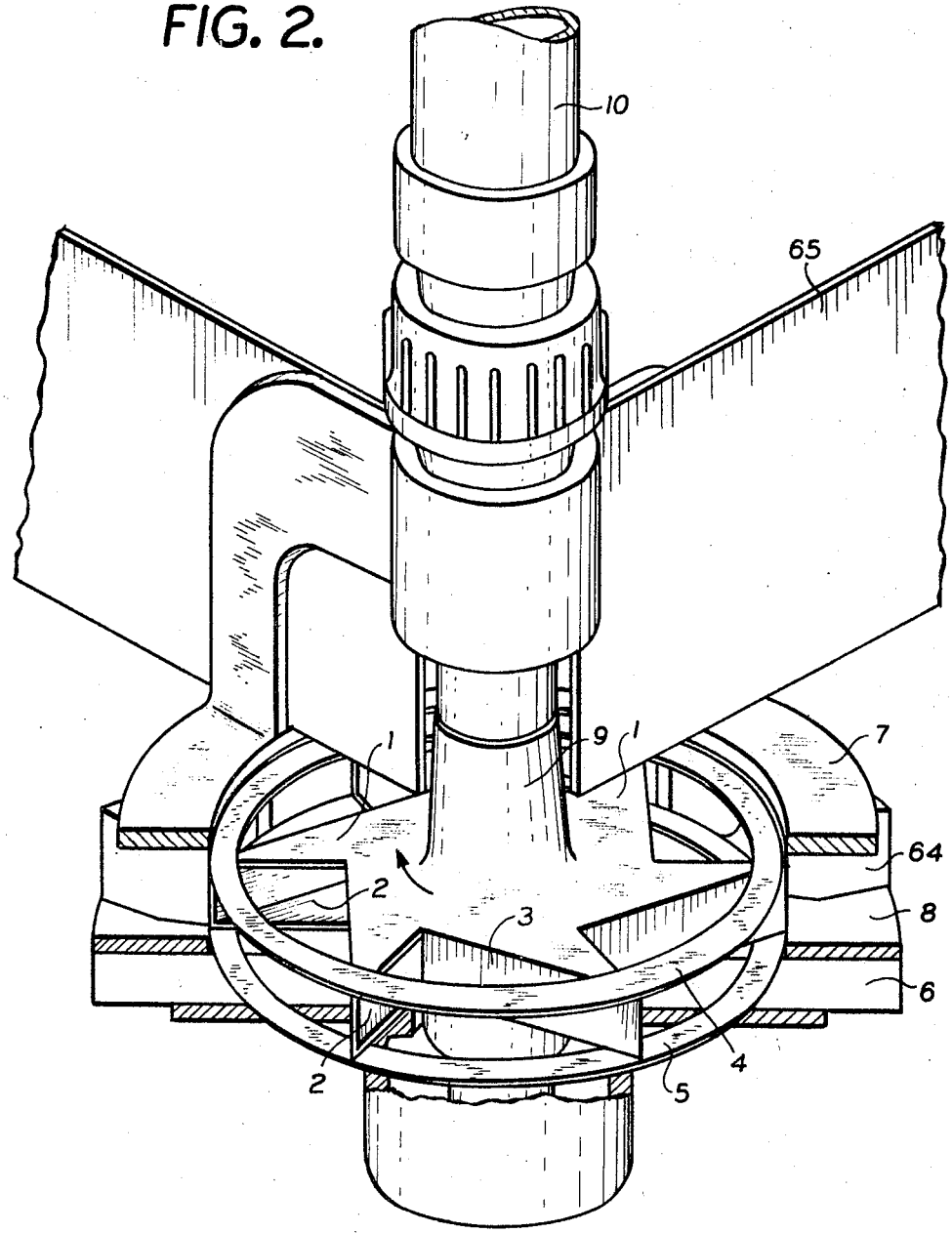
Figure 4:
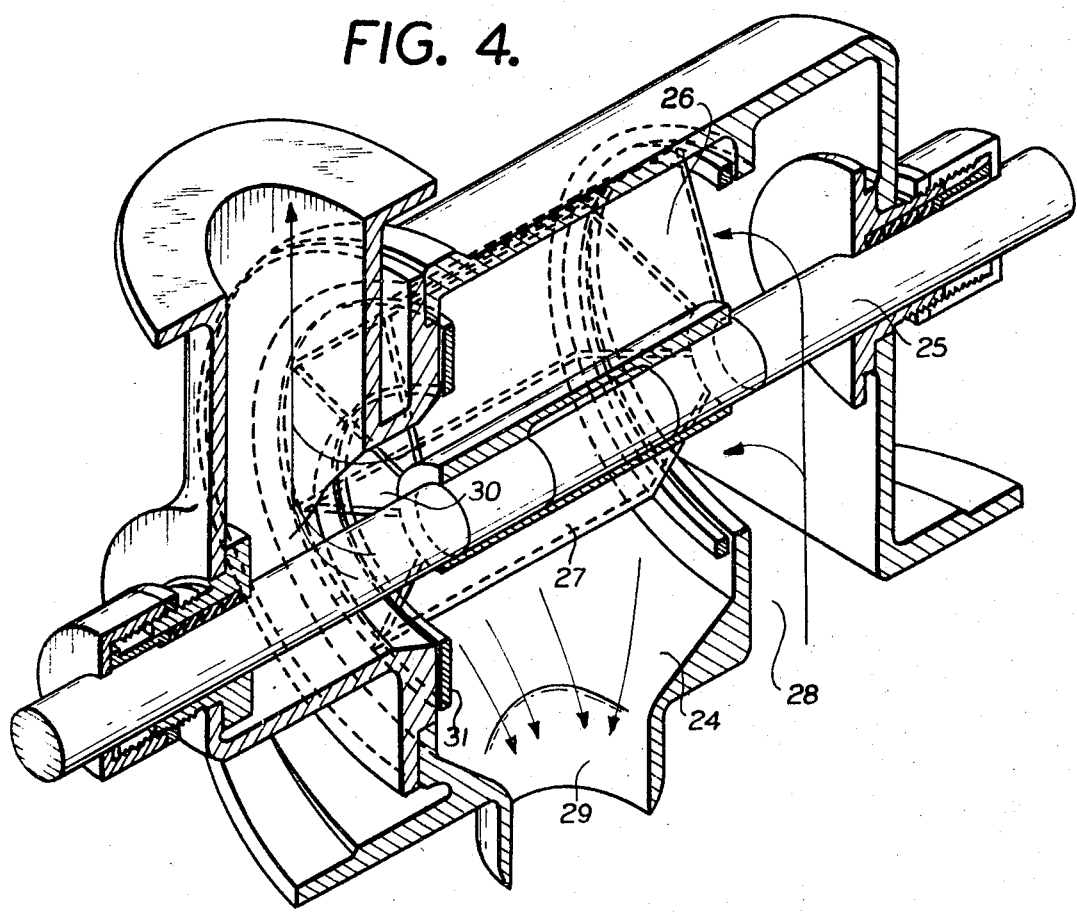
Figure 3:
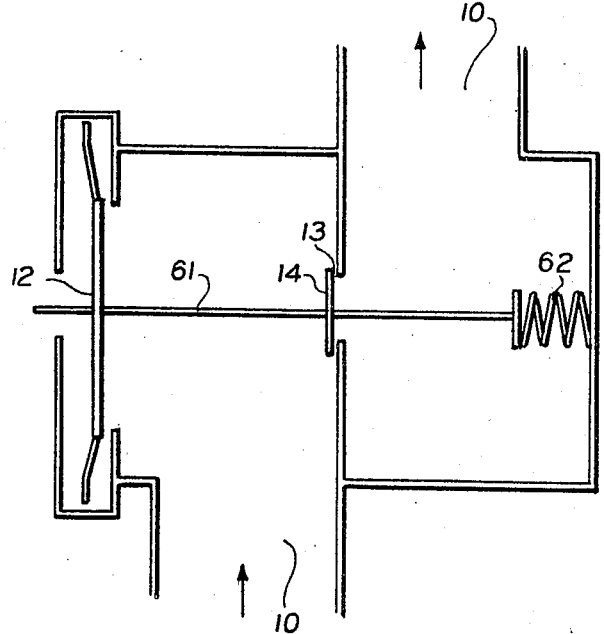
Figure 5:
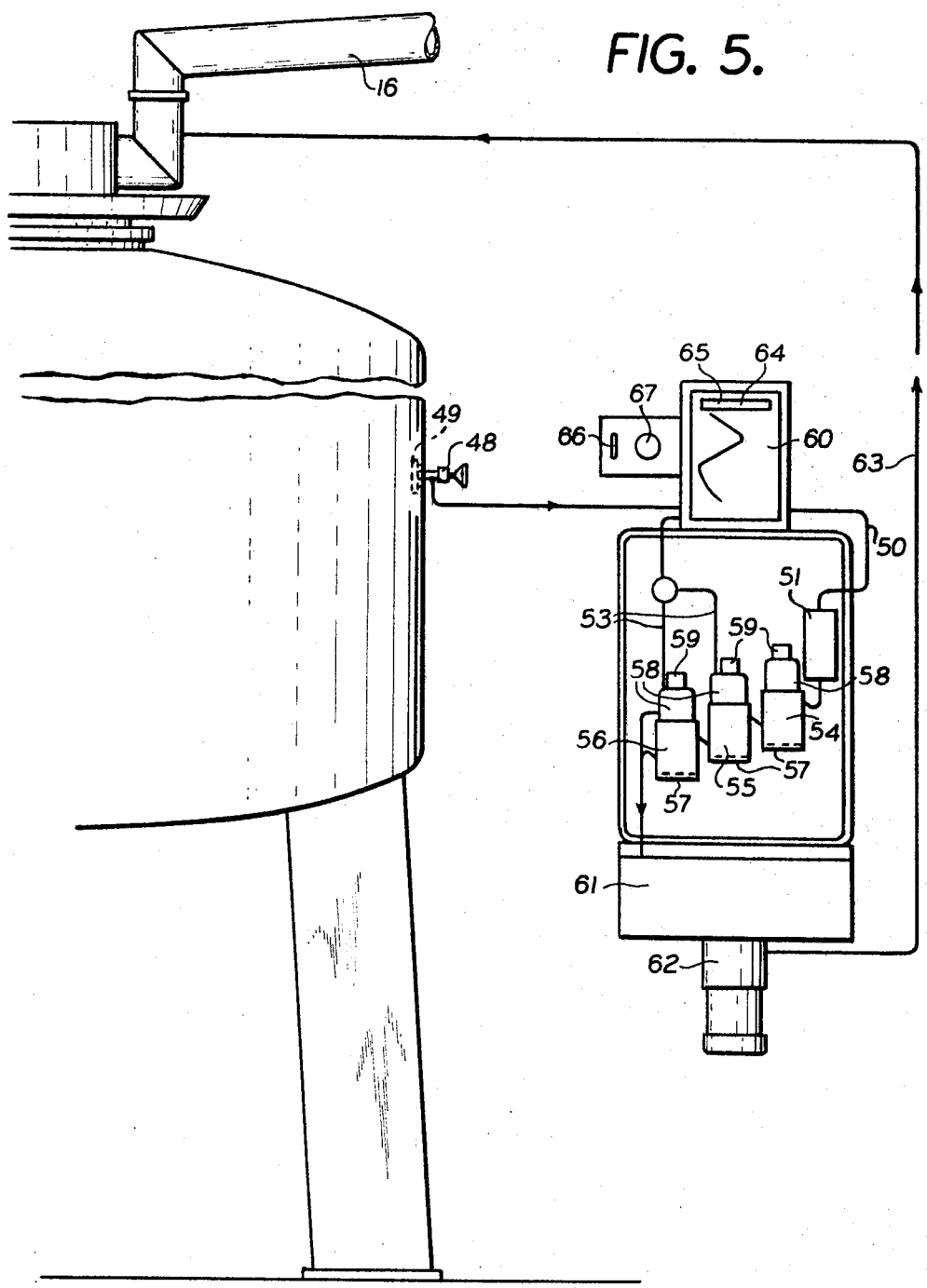

The apparatus according to the invention is illustrated in the appended drawings, in which FIGURE 1 illustrates the apparatus in an over all view. FIGURE 2 is a perspective view of the aeration device. FIGURE 3 diagrammatically shows the device for automatically keeping constant the quantity of air used for aeration. FIGURE 4 is a perspective view of the defoaming device. FIGURE 5 diagrammatically shows the arrangement of the device for automatic determination of the alcohol content.

In order to secure safe operation of the process according to the invention, the structure of the aeration device according to the German Patent No. 961,795 has been fundamentally improved. The improvement concerns the mechanical arrangement insofar as the long and hollow shaft needed as long as the motor of the aerator is mounted on top of large fermentation tanks was replaced by a new and short direct drive having the motor mounted to the bottom of the tank. It was further necessary to decrease the size of the air bubbles and to improve distribution of the finest air bubbles over the whole cross section of the tank. This was achieved by designing a stator in the manner described hereinafter.

Finally, it was necessary, in order to make the process of the invention more economical, to reduce the power consumption of the aerator. This was achieved by fixing two rings to the rotor which limit the quantity of liquid conveyed during rotation of the rotor.

The aeration device shown in FIG. 2 consists of a hollow rotor 9 mounted just above the bottom of the tank on a shaft entering the tank from below and connected from above to a fixed air pipe 10 and of a stator 6 surrounding the rotor 9. The rotor 9 consists of four to eight, preferably six vertical, radially arranged, against the sense of rotation open air outlets 2, of vertical sheets 3 inclined toward the radius and shielding the air outlets against entry of liquid during rotation, of an upper and lower sheet 1 having six edges completing the hollow body, and of an upper and lower ring 4, 5 mounted to the outside of the hollow body. The stator 6 consists of an upper and lower ring 7, 8 and sixteen to thirty-six vertical sheets 64 arranged between the two rings, forming an angle of 25–35° with the radius, and ending within a distance of 0.5–3 mm. from the circumference of the rotor, and of four stabilizing sheets 65. The inner air pipe 10 connected to the rotor from above emerges from the upper part of the tank. Arranged at the outer air pipe is a device 11 for keeping constant the quantity of air introduced into the tank (FIG. 1), a regulating valve 17, and a flow meter 12. The outer air pipe is connected between the device 11 for keeping constant the amount of air and the flow meter 12 by a connecting pipe 15 adapted to be closed by valve 14 with the exhaust air pipe 16. A motor 13 is mounted below the tank and turns the rotor at a speed of 1400 to 1800 revolutions per minute over an elongated shaft, said shaft carrying a mechanical seal to prevent leakage from the bottom of the tank.

The device 11 for keeping constant the quantity of air 11 consists in its simplest form of a manually operated valve.

Each of the many known devices for maintaining constant the fermentation temperature by cooling can be used. The cooler used can be a jacket cooler, pocket cooler, or cooling coil 68. A cooling water valve 20 is regulated continuously or discontinuously by an electric, pneumatic, or any other operating mechanism. It is important to keep constant the fermentation temperature within the prescribed limits.

The device for removing the foam may, for example, consist, in a simple form, of a foam discharge pipe provided with a valve, connected to the foam space of the tank, said valve being opened or closed manually from time to time.

The process according to the invention can be carried out with a tank equipped with the described aeration device and means for keeping constant the fermentation temperature by cooling. Of course, pumps and pipes are necessary for the discharge of vinegar and the charge of mash.

During regular operation—normal fermentation cycle—valve 17 built into the fresh air pipe 10 is always open, while valve 14 remains closed. At the start of the fermentation it is necessary to adjust 80–95% return air. This can be accomplished by opening valve 14. The more valve 14 is being opened the more return air is sucked in by the aerator. The quantity of fresh air indicated on flow mater 12 decreases while opening valve 14. The discharge of finished vinegar in time as well as the charge of fresh mash at constant temperature can be done by manual operation of the pumps. Since it is difficult, however, to keep constant the fermentation temperature during the charge of fresh mash, especially if the latter is cold, the apparatus according to the invention is further provided with a device for automatically keeping constant the fermentation temperature even during charging of new mash. The device for automatically keeping constant the fermentation temperature not only during the regular fermentation cycle but also during the charge of new mash according to the invention, comprises a feeler 18 within the tank, acting on a regulating thermometer 19 provided with two adjustable contacts. When the upper contact of said thermometer 19 is closed during the current cycle, it opens a cooling water valve 20, and when the lower contact is closed, it closes the cooling water valve 20 or a cooling water pump, respectively. Said double contacts are adjusted at an interval of 0.2 to 2° C., preferably 0.5° C. Moreover, the double contact is adjustable on the temperature scale and is adjusted to temperature in the range of between 27 and 34° C., the lower contact preferably to 29° C., the upper contact to 29.5° C. The cooling water valve 20, or the cooling water pump respectively, is connected over a regulating valve 66 and a flow meter 67 to a cooling coil 68 inside the tank. The two contacts operate the charging pump in the same manner during charge, from the moment of magnetic float 47 having passed upwards and closed the second quantity switch 44. Fresh mash is charged as soon as the upper contact has been closed, and the charging pump stops as soon as the temperature has fallen to the value at which the lower contact has been set. In this way, a constant fermentation temperature is assured not only during the current cycle but also during the charge of fresh mash.

The structure of the regulating thermometer has in addition the advantage to be sturdy and relatively simple, the double contacts avoiding fluttering of the contacts during slow approaches occurring in the use of single contacts.

In order to avoid manual control of the air quantity during discharge and charge, the apparatus according to the invention is equipped with a device for automatically keeping constant the quantity of air. Said device (FIG. 3) comprises a closed-in space connected to the air pipe 10, having a narrow pass 13, and containing a membrane 12, said membrane 12 being connected to a throttle plate 14 and a counter spring 62 by a rod 61. During increased suction, occurring during discharge of finished vinegar, the membrane 12 moves the throttle plate 14 toward the narrow pass 13, while during decreasing suction occurring during charge of new mash, the throttle plate 14 is moved away from the narrow pass 13 by the elasticity of the counter spring 62. Due to these changes of the narrow pass 13, the amount of air is kept constant in spite of changes of the suction.

As already mentioned above, appreciable quantities of foam may be formed during submerged white vinegar fermentation at high percentage. In spite of the possibility of removing foam from the foam space from time to time it is advisable according to the present invention to install a mechanical defoamer which makes a smaller foam space possible. Furthermore, it is possible to couple with the mechanical defoamer a device which causes automatic defoaming during the discharge of finished vinegar.

A suitable defoaming device is essentially described in the U.S. Patent No. 3,262,252. The foam pressure within the fermentation tank, which has to be handled by the mechanical defoamer may reach considerable values because during high percentage fermentation smallest errors result in the formation of large quantities of foam containing much liquid. The defoamer has to maintain a steady flow of liquid and undestroyed foam particles within the foam return pipe against the pressure inside the tank. Only in this way is it possible to attain perfect operation of the defoamer during the whole fermentation cycle. Therefore, the speed of rotation of the rotor consisting of radial plates has been increased to 1000–1800 revolutions per minute, preferably to 1450 revolutions per minute, in order to increase its efficiency as a pump. Moreover, the device for mechanical defoaming has been supplemented in such a way that at the end of every fermentation cycle, that is during discharge of finished vinegar, foam is extensively removed from the fermentation tank. This has been attained by the foam return pipe 29 extending downward within the tank (FIG. 1), ending with an opening 32 in the lower part of the tank and being connected by a pipe 33 to the valve 34, said valve being connected to discharge pipe 35.

Thus, a device for mechanical defoaming 21 is fixed to the upper flange of the fermentation tank, said defoaming device being driven either over belts 22 or directly by motor 23. The rotor 26 (FIG. 4) fixed to the shaft 25 and rotating within the spiral housing 24 consists of radial plates 27. The axial inlet of the rotor is connected to the upper part of the fermentation tank by the opening 28 for automatic entry of foam. The periphery of the spiral housing is connected to a foam return pipe 29. An opening 30 of the spiral housing 24 connects its axial outlet with the exhaust air pipe 16. A ring 31 is mounted to the periphery of the rotor thereby closing it partly at its gas escape side and sealing it against the spiral housing.

Foam entering the defoamer through 28 is separated by the rotor into gas and foam enriched with liquid. The exhaust gas leaves the defoamer through the exhaust pipe 16 (FIG. 2). Foam enriched with liquid is pumped back into the lower part of the fermentation tank through the foam return pipe 29. It leaves the foam return pipe at 32. During fermentation the defoamer prevents foam from passing into the exhaust air pipe. Upon operation of the discharging pump 36, said pump removes the mixture of foam and liquid held in motion within the foam return pipe 29 by the pumping action of the defoamer rotor, from the foam return pipe 29 through the discharging pipe 35 and connecting pipe 33 as long as foam enters the defoamer through opening 28. When as a consequence of the lower liquid level foam does not enter the defoamer any more, the discharging pump 36 removes liquid from the tank through the discharging pipe 35, the connecting pipe 33, and opening 32 of the foam return pipe until such a time as the desired level within the tank has been reached.

By means of the described device according to the invention it is possible to automatically prevent the foam formed during the charge and current cycle from passing into the exhaust air pipe and to automatically remove a large part of it from the fermentation tank, during discharge, thereby avoiding an accumulation of larger foam quantities.

In order to reduce power consumption of the defoamer according to the invention, said device has been equipped with a device for automatic operation. The savings in power consumption may be considerable, since, as already mentioned above, formation of foam does not occur regularly and is dependent mainly on errors. If there is no foam, operation of the defoamer is not necessary. In order to control the defoamer automatically, two electrodes 37 built into the upper part of the tank and adjustable in their level are used. Said electrodes form an inner and outer cylinder surface at a distance of 20 to 50 mm. and are starting through suitable wiring the motor of the defoamer when foam rises, and stop it when the foam retreats.

As repeatedly mentioned above, at high total concentrations Acetobacter are highly sensitive to even the slightest irregularity. The fermentation can, therefore, be improved by devices operating automatically and thereby eliminate human errors. For this reason it is highly advantageous to provide the apparatus according to the present invention with a device for the automatic discharge and charge. A device similar to that according to the present invention has been described in German Patent No. 1,063,561. However, the invention disclosed in said patent had to be considerably improved in order to attain practical success. First of all, it has been found that the periodic, automatic determination of the state of fermentation by titration of the acidity is too impractical and too difficult to realize. According to the present invention it is, therefore, still necessary to titrate the acidity and determine the alcohol content of the fermenting liquid from time to time manually. These analyses make it possible to evaluate the moment at which the alcohol content of the fermenting liquid will have reached 0.05 to 0.5%. As mentioned above, the alcohol content must not reach 0.00%, because the fermentation would then come to an immediate stand-still on account of the interrupted metabolism of the Acetobacter cell. Furthermore, vinegar containing a small amount of alcohol has a better aroma than same without. However, from the point of yield, the remaining alcohol content should be as small as possible. The discharge of finished vinegar must take place as late and as rapidly as possible, since acetification continues in the fermentation tank during discharge. Said vinegar is discharged from the fermentation tank through a discharge pipe 200 to 700 mm. above the bottom of the tank and a valve 34 and is pumped by the discharging pump 36 through a sampling vessel 38 into the vinegar storage tank from above. Charging of fresh mash follows immediately afterwards and is done by the charging pump 39 over the charging pipe 40, said charging pipe 40 leading to the upper surface of the fermentation tank and ending shortly above the rotor of the aerator 9. However, charging must take place slowly. An immediate and intimate mixing of the mash with the contents of the fermentation tank must be assured. This is necessary in order to attain a slow decrease of the acidity in the fermentation tank during charging and to avoid a rapid change in the environment of the bacteria.

As stated above, the fermentation temperature must remain constant during charging. It must neither rise nor fall, since this would harm the bacteria immediately. In order to attain an automatic charge and discharge, a scale tube 46 is fitted to the tank and connected to the inside of the tank on both ends. Said scale tube 46 contains a magnetic float 47. The scale tube 46 is provided on its outside with three quantity switches 43, 44, 45. An electric switching device allows through a programmer 41, an adjustable timer 42, and the aforementioned quantity switches the following programs:

After a period preset on the timer 42 has elapsed, the timer 42 turns the programmer 41 to "discharge" thereby starting the discharging pump 36. During said preset period calculated on the basis of the titrated fermentation rate, the alcohol content of the fermenting liquid within the fermentation tank should have reached the desired value. The lowest quantity switch 45 turns the programmer 41 to "charge" as soon as the magnetic float 47 has reached its level. Thereby, the discharging pump 36 is stopped and the charging pump 39 is started.

The second quantity switch 44 is placed just above the lowest quantity switch 45. Between the levels of the lowest quantity switch 45 and the second quantity switch 44 the charging pump 39 operates independently of the fermentation temperature so that a small quantity of alcohol-containing mash can be pumped quickly into the fermentation tank. However, the second quantity switch 44 makes the regulating thermometer 19 control the charging pump 39 as soon as the magnetic float 47 has passed its level, and until it has reached the level of the highest quantity switch 43 in such manner that the charging pump 39 operates only if the upper contact of the regulating thermometer is closed. Thereby, the fermentation temperature in the fermentation tank is kept constant during most of the time during charging. Charging usually takes 2–4 hours.

The highest quantity switch 43 turns, as soon as the magnetic float 47 has reached this level, the programmer 41 to "current cycle," thereby stopping the charging pump 39 and connecting the cooling water valve 20, or the cooling water pump, to the control thermometer 19 in such a way that said control thermometer opens the cooling water valve 20 or starts the cooling water pump only, if its upper contact is closed. During the following current cycle which lasts 24 to 72 hours in dependence on the total concentration, the control thermometer 19 operates the cooling water valve 20 or the cooling water pump, thereby keeping the fermentation temperature constant.

The device according to this invention represents a considerable improvement over the apparatus described in German Patent No. 1,063,561. The end of every fermentation cycle can be predetermined by exact analyses and the discharge and charge can be effected at the desired moment by setting a timer. In view of the high total concentration and the sensitivity of the Acetobacter, the fermentation cycles do not last equally long. Therefore, the apparatus described in German Patent No. 1,063,561, which operates with a constant timing program and is based on constant durations of the fermentation cycles, did not prove useful.

An additional improvement of the device, especially for large fermentation tanks, was achieved according to the present invention by adding an additional, manually operated switch to the above described automatic system. Said switch causes during discharge in its on-position the cooling water valve 20 or the cooling water pump to be controlled by the control thermometer 19. Especially with large fermentation tanks the discharge might take rather long and cooling might become necessary to prevent overheating of the fermenting liquid. Normally, cooling is not foreseen during discharge.

Another modification of the device allows to maintain or avoid automatic cooling during charging. In tropical countries the mash to be charged may have a temperature close to or higher than the fermentation temperature. In this case, a manualy operated switch makes it possible to maintain cooling during charging. The switch causes, during charging and in its on-position, the cooling water valve 20, or the cooling water pump, to be operated by the control thermometer 19. If the switch is in its on-position the control thermometer operates not only the cooling water valve but also the charging pump at the same time.

By choosing among the several possibilities described above, it is possible under all climatic conditions to obtain trouble-free operation of charging and discharging. However, it is still imperative to analyze the alcohol content and the acidity of the fermenting liquid correctly, and to calculate the moment of discharge exactly, and to set the timer properly. It has already been mentioned above that these operations are of great importance with regard to the yield and to the fact that too late a discharge causes the immediate stand-still of the fermentation. In order to exclude the operational hazards due to human errors and to arrive at completely uniform conditions of fermentation, the charging and discharging automatic system according to this invention was equipped also with a device for continuous, automatic analysis of the alcohol content of the fermenting liquid.

The principle of said device has been described in Ebner et al.'s U.S. application Ser. No. 334,959 filed Dec. 4, 1963 and now U.S. Patent No. 3,290,924. For the automatic analysis of the alcohol content in connection with the submerged white vinegar fermentation, the device was improved as follows: A sampling valve 48 (FIG. 5) is attached to the side of the tank and fitted with a fine screen 49 inside the tank. A short connecting hose 50 leads from the sampling valve 48 to the dosing device 51. The dosing device consists of a vessel containing a float and an adjustable capillary, said capillary allowing the adjustment of the flow rate to a constant value between 5 and 15 ml. per minute, preferably 8 to 9 ml. per minute. The fermenting liquid runs through a preheater 54 and two boiling vessels 55 and 56, all of which are equipped with electrical heaters 57 and distillation head pieces 58 with coolers 59. In the preheater 54 and in the first boiling vessel 55 the liquid boils under reflux, unchanged. Due to the action of a preheater 54 the fermenting liquid enters the first boiling vessel 55 at boiling temperature. A dosing device 51 is used, which proved to be better than the small pump and the flow meter suggested in the aforementioned U.S. patent. In the second boiling vessel 56 the bulk of alcohol is distilled off. The column mentioned in the U.S. patent can be omitted. A small amount of alcohol does remain in the liquid, but this can be taken into account in the calibration. A thermocouple 53 reaches into the distillation head pieces of the first and second boiling vessel 55, 56, the thermocouple being directly connected to a line recorder 60. The second boiling vessel 56 is equipped also with an outlet for distillate and an overflow, both leading into a trough 61 arranged below. To the trough a small pump 62 is attached switched on or off by electrodes in dependence on the height of the liquid within the trough, said pump carrying a pipe 63 leading into the exhaust air pipe 16 of the fermentation tank. The pump 62 therefore pumps the liquid back into the fermentation tank automatically.

Provided the line recorder 60 has been calibrated in percent of alcohol, the device makes it possible to read the alcohol present in the fermenting liquid at any time and to adjust the timer to the desired moment of discharge.

To avoid the necessity of carrying out even this last step manually, the line recorder 60 is equipped with an adjustable contact 64 according to a further improved embodiment of the present invention. The contact 64 closes at an alcohol content of the fermenting liquid of 0.5 to 0.5%, preferably 0.2 to 0.1%. A manually controlled switch substitutes in its on-position the adjustable contact 64 of the line recorder 60 for the timer 42. The closed contact 64 then activates the programmer 41, turns it to the position "discharge" and thereby starts the discharging pump 36.

In case of trouble occurring within the device for the continuous automatic determination of the alcohol content, for example current breakdown, cooling water trouble or heating trouble, the indicator of the line recorder moves to the upper or lower stop, because the range of the line recorder reflects a small temperature difference only. The movement of the indicator to the lower stop would activate the discharge, although the fermentation cycle might not have been finished yet. According to a further improvement of the present invention it is therefore of advantage to include a built-in safety device consisting of a second adjustable contact on the line recorder. The upper contact 64 is adjusted to the desired alcohol content of 0.5 to 0.05%, the lower contact 65 to zero. The upper contact 65 activates on closing a timing relais 67; said timing relais 67 starts the programmer 49 and moves it to the position "discharge" only, if during a time interval set on the timing relais 67, preferably three minutes, the lower adjustable contact 65 on the line recorder has not opened. If the lower adjustable contact 65 opens during the preset time interval, the timing relais 67 is stopped and the activation of the programmer 41 is prevented. This circuit arrangement has the further advantage of compensating eventual fluctuations of the indication without activating the discharge.

The electric switching device allows through a programmer, an adjustable timer and the quantity switches the following programs:

Discharge.—After a preset period has elapsed on the timer, it turns the programmer to "discharge" thereby starting the discharging pump.

Charge.—(a) The lowest quantity switch turns the programmer to "charge" as soon as the magnetic float has reached its level; the discharging pump stops and the charging pump starts; (b) the second quantity switch makes the regulating thermometer control the charging pump as soon as the magnetic float has passed its level in such a way that the charging pump operates only if the upper contact of the regulating thermometer is closed.

Current cycle.—The highest quantity switch turns, as soon as the magnetic float has reached this level, the programmer again, thereby stopping the charging pump and connecting the means for supplying cooling water to the control thermometer in such a way that said control thermometer operates said means for supplying cooling water only if its upper contact is closed.

By means of the process and apparatus according to the present invention it is possible to master the ever increasing sensitivity of the Acetobacter, due to the increasing total concentration, to lack of alcohol, uneven aeration, rapid change of the alcohol and acetic acid concentration, fluctuation of temperature, and operational errors and, nevertheless, to achieve uniform and satisfactory fermentations with yields of 95% and higher. The aeration device satisfying severest requirements and having a very low power consumption leads to high fermentation rates at high total concentrations at low consumption of nutrients. By carefully avoiding all possible errors one succeeds in producing white vinegar with an acetic acid concentration of over 12% very economically, in spite of the slow rate of multiplication of the Acetobacter under very strenuous conditions. Although it is impossible to keep the adapted Acetobacter strain by using conventional methods of bacteriology, the above described process shows a way to keep constant the characteristics of the strain and to make the strain available for other fermentations. The results obtained by means of the process and apparatus according to the present invention, strongly support the conclusion that, for example, 14% acetic acid in the finished vinegar already obtained by the applicant do not represent an upper limit. It seems reasonable to assume that according to the invention vinegar with higher concentrations of acetic acid can economically be produced.

The term "white vinegar" is used herein to denote a vinegar produced from ethylalcohol diluted with water. As, in comparison with e.g. "cider vinegar" produced from cider or "wine vinegar" produced from wine, vinegar made from diluted alcohol shows no color, such product is well known under the name "white vinegar."

What is claimed is:

1. Process for the production of vinegar by submerged fermentation, comprising filling into a fermentation tank unfiltered and untreated vinegar having an alcohol content of 0.05 to 1.5% by volume and an acetic acid concentration of 11.5 to 13% weight by volume, produced by submerged fermentation and stored under access of air to the liquid between 0 and 35° C.; starting aeration for substantially uniformly supplying, without interruption, the total volume of liquid with finest air bubbles; adding after reaching the fermentation temperature of 27–34° C., and while same is maintained constant within this range by automatic cooling, a quantity of mash containing 0–2% acetic acid and 11–14% alcohol under rapid mixing until the contents of the fermentation tank attain a concentration of 6–9% acetic acid and more than 4% alcohol; adding per 1000 liters of the contents of the fermentation tank 1.0 to 3.0 kgs. of nutrients for the bacteria; adjusting 80–95% return air and 5–20% fresh air prior to the start of an increase of the acidity; adjusting only fresh air after the beginning of acetification in a qauntity of 2.5–6 m.³ per hour per 1000 liters of fermenting liquid; discharging, when reaching a concentration of 0.05 to 0.5% of alcohol, such a quantity of vinegar from the fermentation tank that refilling at constant temperature and rapid mixing with mash of a concentration of 0–2% acetic acid and 12–15% alcohol and containing per 1000 liters 1–3 kgs. of nutrients for the bacteria, leads to a starting concentration of the contents of the tank for this fermentation cycle of 6–9% acetic acid and 5–7% alcohol; repeating the step of discharging vinegar from the tank and refilling it with mash before 0.00% alcohol is reached; keeping continuously constant the supplied quantity of air during all normal fermentation cycles independently of the filling height in the tank; and maintaining constant the total concentration of the mash during successive fermentation cycles within a range of ±0.3%.

2. Process for the production of vinegar by submerged fermentation, comprising filling into a fermentation tank filtered sterile vinegar produced by a process with an acetic acid concentration of 11–12% and an alcohol content of 0.5–0.0%; adding mash having a concentration of 0–2% acetic acid and 15% alcohol, in a quantity until the contents of the fermentation tank attain a concentration of 6–9% acetic acid and 4–6% alcohol; adding to 1000 liters of the contents of the fermentation tank 1.0 to 3.0 kgs. of nutrients for the bacteria; starting the aeration supplying without interruption the total volume of liquid with finest air bubbles; adding per 1000 liters of fermenting volume, after reaching the fermentation temperature of 27 to 34° C. and while same is maintained constant within this range by automatic cooling 1–5 liters of inoculum from a submerged vinegar fermentation, while supplying air to the inoculum without interruption for more than 10 seconds; adjusting 80–95% return air and 5–20% fresh air prior to the start of an increase of the acidity; adjusting only fresh air after the beginning of acetification in a quantity of 2.5–6 m.³ hour per 1000 liters of fermenting liquid; discharging, when reaching 0.05 to 0.5% of alcohol, such a quantity of vinegar from the fermentation tank that refilling at constant temperature and rapid mixing with mash of a concentration of 0–2% acetic acid and 12–15% alcohol and containing per 1000 liters 1–3 kgs. of nutrients for the bacteria, leads to a starting concentration of the contents of the tank for this fermentation cycle of 6–9% acetic acid and 5–7% alcohol; repeating the step of discharging vinegar from the tank and refilling it with mash before 0.00% alcohol is reached; keeping continuously constant the supplied quantity of air during all normal fermentation cycles independently of the filling height; and maintaining constant the total concentration of the mash during successive cycles within a range of ±0.3%.

3. Process as claimed in claim 1, comprising removing foam from the top of the fermenting liquid during discharge.

4. Process as claimed in claim 2, comprising removing foam from the top of the fermenting liquid during discharge.

References Cited

UNITED STATES PATENTS

| 2,707,683 | 5/1955 | Hromatka et al. | 99—147 |
| 2,997,424 | 8/1961 | Mayer | 99—147 X |
| 3,014,804 | 12/1961 | Els et al. | 99—147 |

A. LOUIS MONACELL, *Primary Examiner.*

ROGER B. ANDEWELT, *Assistant Examiner.*

U.S. Cl. X.R.

195—49